US008252969B2

(12) United States Patent
Yokley et al.

(10) Patent No.: US 8,252,969 B2
(45) Date of Patent: Aug. 28, 2012

(54) HYPERNUCLEOPHILIC CATALYSTS FOR DETOXIFICATION OF CHEMICAL THREAT AGENTS

(75) Inventors: Edward Maxwell Yokley, Vienna, VA (US); Ralph Bendt Nielsen, McLean, VA (US)

(73) Assignee: Science Applications International Corporation, San Diego, CA (US)

( * ) Notice: Subject to any disclaimer, the term of this patent is extended or adjusted under 35 U.S.C. 154(b) by 1202 days.

(21) Appl. No.: 11/849,377

(22) Filed: Sep. 4, 2007

(65) Prior Publication Data

US 2011/0028774 A1    Feb. 3, 2011

(51) Int. Cl.
*G21F 9/00* (2006.01)
*A62D 3/00* (2007.01)

(52) U.S. Cl. ............ 588/313; 588/6; 588/300; 588/401; 588/408

(58) Field of Classification Search ......................... None
See application file for complete search history.

(56) References Cited

U.S. PATENT DOCUMENTS

| | | | | |
|---|---|---|---|---|
| 3,708,445 A * | 1/1973 | Junas et al. | ............ | 524/503 |
| 4,201,822 A * | 5/1980 | Cowsar | ............ | 442/64 |
| 4,591,625 A | 5/1986 | Mathias | | |
| 4,661,598 A | 4/1987 | Mathias | | |
| 4,687,817 A | 8/1987 | Harada et al. | | |
| 4,883,608 A * | 11/1989 | Trujillo et al. | ............ | 252/189 |
| 5,120,846 A | 6/1992 | Cutie et al. | | |
| 6,805,844 B1 * | 10/2004 | Holt | ............ | 422/129 |
| 6,960,701 B2 | 11/2005 | Morrissey | | |
| 7,268,269 B2 * | 9/2007 | Axtell et al. | ............ | 588/299 |

OTHER PUBLICATIONS

Delany, Edwards, et al. "Poly(ethylenimines) with Alternative (Alkylamino)pyridines as Nucleophilic catalysts" J. Am. Chem. Soc. 104, 799-807 (1981).*
Jitao, Huang, et al. "Synthesis and Polymerization of Diallylaromatic amines as supernucleophilic Reagents". Polymer 37, 837-841 (1996).*
Lon, Mathias. et al. Synthesis, Cyclopolymerization and Cyclopolymeration of 4-Diallylamino pyridine: a New Monomer. Journal of Polymer Science: Polymer Letters Ed. 23, 289-297 (1985).*
Mathias, L.J. et al., Macromolecules, 1987, 20, 2645.
Rubinsztajn, S., et al., Macromolecules, 1990, 23, 4026.
Hierl, M.A., et al., J. Am. Chem. Soc., 1979, 101, 6020.
Chen, H. et al., J. Am. Chem. Soc. 2005, 126, 13305.

\* cited by examiner

*Primary Examiner* — Melvin C Mayes
*Assistant Examiner* — Sheng H Davis
(74) *Attorney, Agent, or Firm* — Banner & Witcoff, Ltd.

(57) ABSTRACT

A polymeric hypernucleophilic catalyst is effective for hydrolytic destruction of chemical threat agents under mild conditions, e.g., near neutral pH and at ambient temperatures. The polymeric hypernucleophilic catalysts are particularly useful to affect rapid destruction of chemical threat agents on sensitive surfaces such as paint, metal, rubber, plastic, fabric, wood, and skin. Catalyst formulations such as creams, lotions, sprays, foams, powders, or gels, and articles such as filters, wipes, membranes, yarns, fabrics, and articles of clothing, may be used for detoxification of or prophylactic protection against chemical threat agents.

21 Claims, No Drawings

HYPERNUCLEOPHILIC CATALYSTS FOR DETOXIFICATION OF CHEMICAL THREAT AGENTS

BACKGROUND

Chemical warfare (CW) agents and toxic industrial chemicals/materials (TIC/TIM) can pose a significant threat to military and civilian personnel and resources. Despite significant research, existing materials and methods for agent neutralization and mitigation are not effective for achieving rapid catalytic destruction of a wide range of chemical threat agents under mild conditions.

Chemical warfare nerve agents, blister agents, most other CW agents, and most significant TIC/TIM threat agents act through electrophilic reactions on nitrogen-containing nucleophilic residues on enzyme and protein molecules in exposed tissue and mucous membranes. The most highly toxic CW agents are drug-like, hydrophobic molecules having rapid transdermal/transmembrane transport and high reactivity in hydrophobic environments. Their hydrophobicity makes them difficult to transport into water and to hydrolyze by conventional aqueous pH-driven processes, which are typical routes to detoxification.

Existing broad spectrum technologies for threat mitigation generally rely on sorbent materials, combined with non-specific oxidation processes or pH-driven hydrolysis of agents by caustic. High temperature, high pressure hydrolysis with strong caustic is a widely used process for CW agent destruction in controlled reactor environments, such as those used for weapon demilitarization. However, the process is not effective for decontamination in ambient conditions or without damage to structures and surfaces. Caustic conditions are generally considered to be pH 10 or higher. By contrast, compatibility with skin, paint, fabric and other sensitive surfaces generally requires threat destruction that is effective nearer neutral pH, in the range of pH 5-10, and more preferably in the range of pH 6-9 or pH 7-8. Because most known mitigant materials are not catalytic, large quantities of mitigant are usually needed to handle even modest amounts of a threat agent. Solution peroxide carriers also have been disclosed, e.g., in Morrissey et al. U.S. Pat. No. 6,960,701. Oxidant vapor materials, vaporous hydrogen peroxide and chlorine dioxide generally require equipment for on-site generation of the mitigant materials, and difficulties with storage of precursor materials are often encountered. In general, these mitigant materials are costly, corrosive, difficult to handle, and may create significant damage to the structures to which they are applied. Recently, surface-bound chloramide oxidants have shown promise for biological threat destruction on fabrics and other surfaces. However, these approaches still lack the generality and capacity needed for chemical threat protection. More recently, enzymatic destruction has also been pursued, but these methods are generally costly and inefficient because of the complexity and large molar mass of typical enzymes, and in some cases chiral selection may enrich the more toxic enantiomer of a threat agent.

SUMMARY

In one aspect, a polymeric hypernucleophilic catalyst may be used for hydrolytic destruction of chemical threat agents under mild (e.g., near pH neutral) conditions. The charged, polymeric materials are not readily absorbed through skin or mucous membranes, and therefore are generally non-toxic to humans. The mild catalytic conditions are compatible with skin exposure and with metal and painted surfaces, minimizing the complications of post-threat cleaning and recovery of infrastructure. The polymeric hypernucleophilic catalysts are particularly useful to cause rapid destruction of chemical threat agents on sensitive surfaces such as paint, metal, fabric, wood, and skin at or near ambient temperatures and near neutral pH conditions. Polymeric hypernucleophilic catalyst formulations may be prepared as creams, lotions, sprays, foams, powders, or the like, and may be applied for detoxification of chemical threat agents or prophylacticly against such threat agents.

In another aspect, small molecule hypernucleophilic catalysts may be used for rapid destruction of chemical warfare agents under controlled conditions, such as in an enclosed reactor environment. In these cases, high temperature and/or caustic environments may be used. The small molecule hypernucleophilic catalysts also are useful for rapid destruction of chemical warfare agents in uncontrolled, open environments, such as in the atmosphere (e.g., against vapor or aerosol threat agents), in water, or on surfaces such as the ground.

DETAILED DESCRIPTION

The term chemical warfare (CW) agent is inclusive of a variety of nerve agents, blister agents, mustard agents, and the like. The term toxic industrial chemical/material (TIC/TIM) is inclusive of a variety of materials such as phosgene, ethylene oxide, methyl isocyanate, phosphorus oxychloride, and the like. Chemical warfare agents and toxic industrial chemicals/materials are collectively referred to herein as chemical threat agents. The chemical threat agents of most concern are hydrolysable, reactive toward polarizable nucleophiles and adsorbed onto non-polar surfaces or into non-polar materials such as solvents, plastics, rubber, fabrics, fibers, and paint films. Of particular concern are phosphate nerve agents, phosgene, ethylene oxide, methyl isocyanate, and mustard agents.

Hypernucleophilic catalysts have been developed in the chemical synthesis industry and exhibit properties as acyl transfer catalysts. Hypernucleophilic catalysts are effective for promoting reactions of electrophilic acyl species such as phosgene, acetyl chloride, methyl isocyanate and acetic anhydride. They have also been used with phosphorylating agents (including insecticide precursors) and alkylating agents (including ethylene oxide and many other toxic industrial chemicals/materials). An example of a hypernucleophilic catalyst is 4-dimethylaminopyridine (DMAP), the structure of which is illustrated below.

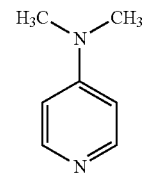

While DMAP and close derivatives are best known, other hypernucleophilic catalysts of interest include alternatively substituted pyridines, imidazoles including histidine, substituted guanidines, etc. Monomeric DMAP catalysis has been used in the agricultural products industry in the synthesis of insecticides, including organothiophosphates, fungicides, and herbicides. An example of catalytic phosphoryl transfer used in synthesis is the use of DMAP and a quaternary ammonium salt as co-catalysts for the commercial synthesis of the organothiophosphate insecticide Chlorpyiphos (DURSBAN®), which is described in Cutie et al. U.S. Pat. No. 5,120,846.

Other examples of hypernucleophilic catalysts include nitrogen-containing heterocycles, other pyridines, imidazoles, nitrogen amine bases, and amides. Table I below compares the reactivity rates of various substituted pyridine catalysts for an acyl transfer reaction in benzene solvent.

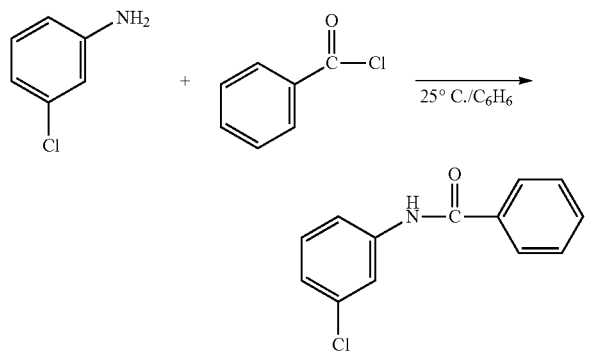

TABLE I

| Catalyst Relative Reactivity | |
|---|---|
| Catalyst | Reaction Rate Constant |
| DMAP | 10,600 |
| Triethylamine | 0.72 |
| Pyridine | 1.8 |
| N,N-Dimethylaniline | 0.8 |
| 4-Methylpyridine | 10.0 |
| 2,6-Dimethylpyridine | 0.3 |

Litvinenko, L. M. et al., Chem. Abstr. 1968, 68, 68325.

The absolute and relative reactivities of various hypernucleophilic catalysts have been reported to vary widely in various solvents and reaction environments, so a single ranking of relative reactivity may not be useful for identifying useful catalyst structures. In particular, it has been observed that the catalysis rate may be highly dependent on the polarity of organic solvents in the reaction mixture, and that the catalysis may be faster in heterogeneous two-phase environments than in homogenous solution. Catalyzed reactions in such heterogeneous environments can also be influenced by phase transfer catalysts such as quaternary ammonium cations that affect the transport, solvation and reactivity of nucleophilic anions.

DMAP and other small molecule hypernucleophilic catalysts typically are toxic, and therefore are generally unsuitable for use as topical protectants. In the case of 4-dimethylaminopyridine, the molecule is readily absorbed through the skin and is highly toxic by skin absorption. It also may cause eye burns. As a result, small molecule hypernucleophilic catalysts are generally unsuitable for use in open environments or for direct protection of persons.

To alleviate toxicity, hypernucleophilic catalyst polymers have been prepared by several routes. For example, the reaction of 4-chloropyridine with polyethylenimine forms Polymer B as shown, and reaction of 4-chloropyridine with diallylamine forms 4-diallylaminopyridine (DAAP) monomer, which undergoes radical polymerization to form Polymer A as shown. The latter synthesis is further described in Mathias, L. J. et al., *Macromolecules,* 1987, 20, 2645 and in U.S. Pat. Nos. 4,591,625 and 4,661,598.

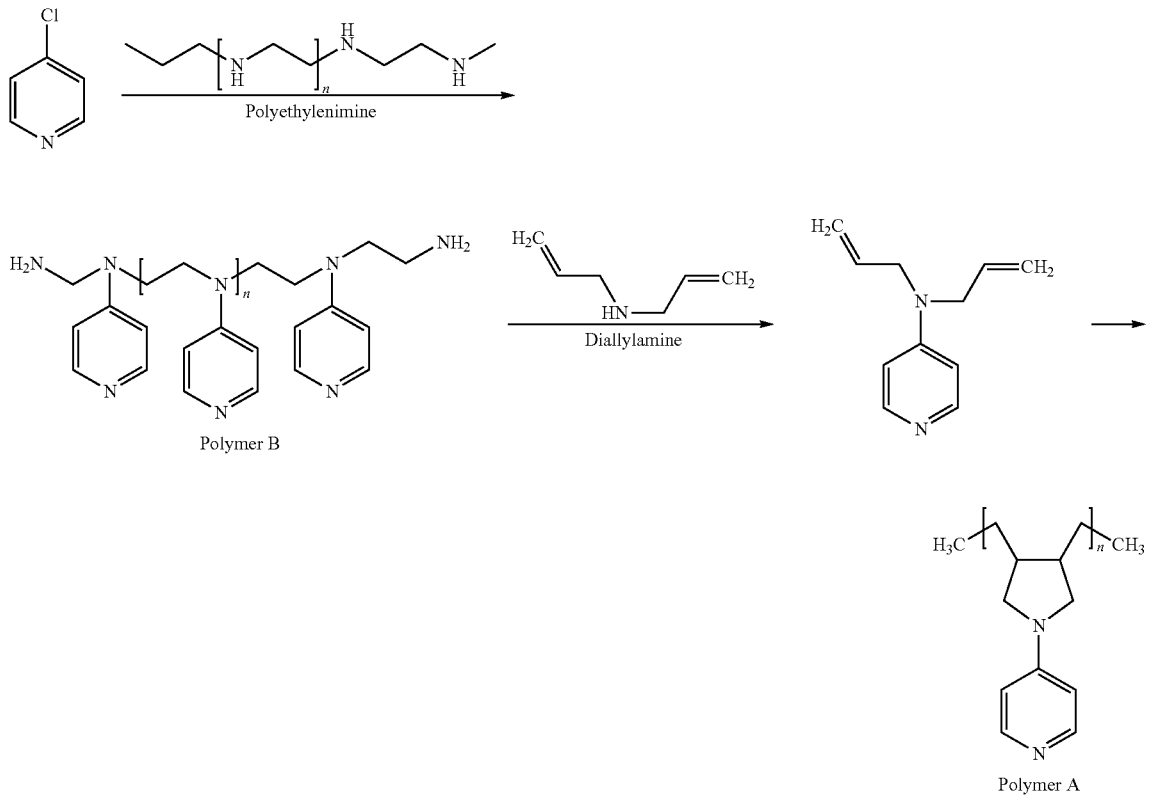

The molecular weight of the hypernucleophilic catalyst polymers can vary widely, and often ranges from about 5,000 to about 1,000,000. Cross-linked polymers may be used, where the molecular weight is much higher. The term "polymer" is used herein in a broad sense to refer to molecules formed by the chemical union of a plurality of monomers, and is inclusive of molecules and formulations that may be characterized as oligomers, cross-linked resins, solution polymers, latex polymers, polyols, etc.

Mathias, L. J. et al., *Macromolecules,* 1987, 20, 2645, reports that properly designed polymers can catalyze acyl transfer reactions between 50 and 10,000 times faster than the fastest (4-pyrrolidinopyridine) small-molecule catalysts. Two effects were proposed for this observation. First, the hydrophobicity of the polymer promotes interaction with the hydrophobic electrophile. Second, the basicity of the catalyst groups is lowered substantially, due to disfavored charge interactions between neighboring cationic groups along the chain. This lowered basicity results in high concentrations of free, deprotonated nucleophiles being available for reaction at pH values between pH 7 (neutral) and pH 10. This compares favorably to the small-molecule hypernucleophilic catalyst where pH values of 10 or higher are typically needed for effective hydrolysis of chemical threat agents.

Other examples of hypernucleophilic catalyst-containing polymers include those based on the formation of polysiloxanes, as described in Rubinsztajn, S. et al., *Macromolecules,* 1990, 23, 4026; the attachment of hypernucleophilic catalyst groups to pre-formed polymers, as described in Hierl, M. A. et al., *J. Am. Chem. Soc.* 1979, 101, 6020; and the attachment of hypernucleophilic catalysts to the surface of mesoporous silica particles, as described in Chen, H. et al., *J. Am. Chem. Soc.* 2005, 126, 13305.

Polymer-bound 4-dialkylaminopyridines may be prepared by reaction of 4-alkylaminopyridines with chloromethylpolystyrenes. In addition to homopolymer catalysts, copolymers also may be prepared. For example, a DAAP monomer may be copolymerized with a variety of monomers such as vinyl, acrylic, and allylic monomers. Such co-monomers may be used, for example, to adjust the reactivity and/or physical properties of the catalyst. Polymers prepared with diallyldialkylammonium co-monomers may be particularly useful as multimode polymeric catalysts, since copolymerization yields a hypernucleophilic catalyst that incorporates a quaternary phase transfer agent onto the polymer backbone. Such materials are described, for example, in Mathias U.S. Pat. No. 4,591,625.

Reaction of 4-aminopyridine with ethylene oxide gives the corresponding N-(4-pyridyl)diethanolamine, which may be condensed with diacid derivatives to give 4-dialkylaminopyridyl polyesters and polycarbonates. Epoxy derivatives of 4-dialkylaminopyridines also may be prepared. These polyesters and polycarbonates may be designed with a wide variety of properties based on the identity of the co-monomers.

While not wanting to be bound by theory, it is believed that the hypernucleophilic catalyst reacts with the threat agent electrophile, forming a reactive intermediate (2), which is rapidly decomposed to reform the catalyst (1) and hydrolysis products (3) of the threat agent, as illustrated below.

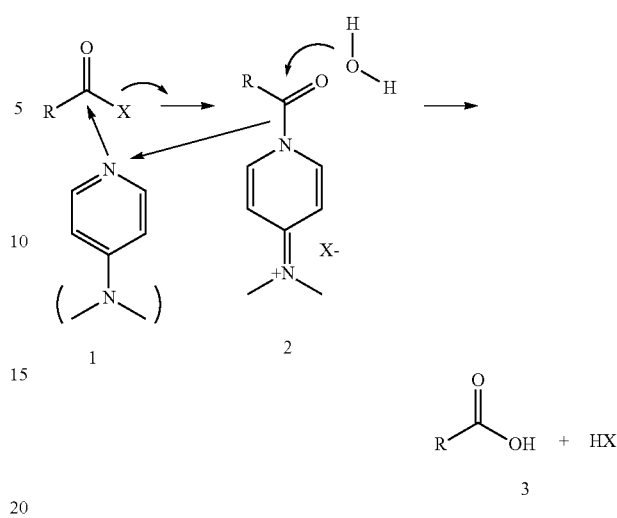

The hydrolysis of threat agents commonly produces acidic by-products, such as the carboxylic acid and HX products shown. It is advantageous to use the catalysts of the invention in formulations with mild base or buffers, to maintain a near constant pH. The buffers may include amine, acetate, phosphate, carbonate, borate, or other buffers known in the art, including polymeric buffers, which may be particularly suitable for surface and fabric applications.

The two-step catalyzed hydrolysis pathway may be several orders of magnitude faster than the direct hydrolysis through attack of water on the initial electrophile. The process is similar to the nucleophilic action of the nitrogen-containing histidine group of AChE enzyme, both in normal function with acetylcholine and with nerve agents that target the enzyme. This similarity in chemical action is important for achieving high-performance, selective destruction of threat agents, contributing to the generality of these catalysts toward a broad range of threats that attack protein and enzyme targets. The specificity of these catalysts for reaction with electrophilic threats also contributes to their efficiency. These catalysts also function well at much lower mitigant to threat ratios than typical non-specific oxidant and sorbent approaches, which can be saturated or consumed by common, non-toxic interferents such as fuel, solvents, etc.

Self-decontaminating and protective formulations, such as solutions or coatings, may repel contamination or self-decontaminate when applied to various materials while preserving the appearance of the material. The formulations may be applied on sensitive surfaces such as paint, metal, fabric (e.g., clothing), wood, rubber, plastic, and skin at or near ambient temperatures and neutral pH conditions. Polymeric hypernucleophilic catalyst formulations may be prepared as creams, lotions, sprays, foams, powders, or the like. The formulations usually contain from about 2 to about 40 wt % of the polymeric hypernucleophilic catalyst.

The formulation may be in the form of an aerosol spray, powder or liquid (e.g., water- or solvent-based), or lotion. The formulation may modify the surface of a wide range of materials to enhance the material's ability to repel contamination and/or self-decontaminate.

The hypernucleophilic catalyst polymers are highly effective to rapidly destroy chemical threat agents at or near neutral pH conditions, such as a pH ranging from about 5 to about 10, or more preferably for some applications from about 6 to about 9, or from about 7 to about 8. The polymers are much more effective than strong caustic alone, concentrated hydrogen peroxide, or quaternary salt phase transfer catalysts. This efficacy coupled with the low toxicity enables the use of the polymer catalysts in self-decontaminating sprays, lotions, wipes, gels, foams, concentrates, wash solutions, and the like, which are suitable for contact with skin and other sensitive surfaces. The formulations may be simple, and non-corrosive, and may incorporate a range of excipients such as builders, co-solvents, surfactants, binders, and the like. Particularly useful additives include buffers, latex polymers, phase transfer catalysts, and surfactants.

The polymeric hypernucleophilic catalyst materials may be formed into articles that are useful for detoxification treatments or prophylactic protection against chemical threat agents. For example, the polymeric materials may be spun into fibers and then extruded as membranes that are self-decontaminating upon washing the surface with water or a mild base. The fibers may be formed into fabrics (e.g., woven or non-woven), such as articles of clothing, filters, wipes, and the like, using well known techniques.

Alternatively, the polymeric hypernucleophilic catalyst materials may be incorporated into other materials. For example, polymeric hypernucleophilic catalyst materials such as epoxy derivatives of 4-dialkylaminopyridines may be attached to fabrics or membranes through reactive alcohol or amine functionality to produce self-decontaminating yarns, fabrics (e.g., clothing), wipes, filters, or other useful objects.

EXAMPLES

The following examples are provided for illustrative purposes and should not be regarded as limiting the scope of the invention.

Example 1

This example describes the synthesis of DAAP polymer (Polymer A). 4-(N,N-diallylamino)pyridine (DAAP) was prepared as described in Mathias, L. J. et al., *Macromolecules*, 1987, 20, 2645 and Mathias U.S. Pat. No. 4,591,625, and was purified by fractional vacuum distillation. In a glass reaction vessel was placed DAAP monomer (5.0 g, 28.7 mmol), which was cooled in ice and stirred as 3.2 g concentrated hydrochloric acid was slowly added (12 M HCl, Fisher), followed by 0.150 g 2-2'-azobis(-2-methylpropionamidine) dihydrochloride (Aldrich) as initiator. The mixture was heated for 18 h in a bath at 65° C., and 0.050 g additional initiator was added, followed by continued heating for 24 h. A yellow-brown, slightly turbid, viscous solution resulted, and was used as prepared in the following examples.

Example 2

This example describes the effect that several hypernucleophilic catalysts exhibit on the half life of O,O'-diethyl chlorothiophosphate. A mixture of catalyst in 200 µl deionized water was placed in a 20 ml screw cap sample vial, followed by 5 ml of aqueous buffer, 5 ml of dichloromethane (Aldrich), and 75 µl of a mixture of 2:1 (v/v) simulant (O,O'-diethyl chlorothiophosphate, Aldrich) and an internal standard (n-decane, Aldrich). The mixture was stirred vigorously with a magnetic stirrer at room temperature. Samples of the lower phase (dichloromethane) were withdrawn periodically and analyzed by gas chromatography (Hewlett Packard Model 5890 Gas Chromatograph, He carrier, thermal conductivity detector, methyl-phenyl siloxane capillary column, 95° C. isothermal) to determine the disappearance of the simulant relative to the internal standard. The following table provides a brief description of the catalysts used:

| Catalyst | Description |
|---|---|
| DMAP, .25x | 9.5 mg, ~25 mol % (relative to simulant) |
| Polymer A, .25x | 22.5 mg solution (Ex. 1), ~25 mol % |
| Polymer A, 0.05x | 5 mg solution (Ex. 1) ~5.5 mol % |
| DMAP, 1.1x | 42 mg, ~110 mol % |
| CTAC Quaternary | 10 mg cetyltrimethylammonium chloride (Fluka) |
| 5% Peroxide | 1 ml 50% $H_2O_2$ added to buffer |
| TOAB Quaternary | 10 mg tetraoctylammonium bromide (Aldrich) |

Table II below shows the effect of the hypernucleophilic catalysts on the half life of O,O'-diethyl chlorothiophosphate at several different pH conditions.

TABLE II

Half-life of O,O'-Diethyl Chlorothiophosphate (minutes)

| Catalyst | Buffer | | | |
|---|---|---|---|---|
| | 1M pH 7.0 Phosphate buffer | 1M pH 9.8 Carbonate buffer | 1M pH 11.33 Phosphate buffer | 4M pH ~14 NaOH |
| None | >1,600,000* | | | >460,000* |
| DMAP, .25x | 71 | 3.7 | 4.0 | 3.2 |
| Polymer A, .25x | 9.2 | 4.8 | 6.6 | 4.0 |
| Polymer A, 1.1x | 1.5 | | | 0.8 |
| Polymer A, 0.05x | 36 | | | 16.5 |
| DMAP, 1.1x | 12.5 | | | 0.4 |
| CTAC Quaternary | >200,000* | | | 11,000 |
| 5% Peroxide | >510,000* | | | 36,000 |
| TOAB Quaternary | 10,000 | | | 4,700 |

(*half life values >50,000 min were not accurately measured in the timeframe of the experiment)

Both the small-molecule and polymeric hypernucleophilic catalysts provided rapid destruction of the simulant at pH 9.8-14, and provide clear acceleration relative to non-catalyzed water, basic peroxide solution or quaternary ammonium surfactant/phase transfer agent alone. The most remarkable result is the rapid destruction of the simulant by the hypernucleophilic polymeric catalysts (Polymer A) at pH 7. At neutrality, the polymer is only a factor of 2 less reactive than at pH 14, and is a factor of 8 faster than the small molecule DMAP under the same conditions. This broad spec trum activity represents a significant improvement to currently available methods.

Example 3

This example shows the hydrolysis kinetics of another simulant, diethylchlorophosphate, which was examined in the manner as described in Example 2 above, the results of which are shown in Table III below.

TABLE III

Half-life of Diethylchlorophosphate (minutes)

| Catalyst | Buffer | |
| --- | --- | --- |
|  | 1M pH 7.0 Phosphate buffer | 4M pH ~14 NaOH |
| None | 2,600 | 130 |
| DMAP, .25x | 4.6 | <0.1* |
| Polymer A, .25x | 0.2 | 0.1 |
| Polymer A, 1.1x | <0.1* | <0.1* |

*half life values <0.1 min indicate that <0.3% remained after the first measurement point (1 min.)

Example 4

This example shows the effect combining the hypernucleophilic catalyst in an aqueous decontamination solution containing latex polymer particles. This example is based on observations that the catalytic destruction of threat agent simulant is slower in homogeneous reaction environments containing only water or ethanol than in heterogeneous mixtures with water-immiscible organic solvent such as dichloromethane, as described in Example 2. The latex material used in this example is DUR-O-SET E 200, commercially available from Celanese Corporation. This is an ethylene-vinyl acetate copolymer latex with 55% polymer solids, stabilized by poly(vinyl alcohol) as surfactant, and with a particle size in the range of 100-200 nm. A control (Sample A) with no catalyst was prepared by combining 1.0 mL water containing 0.025 g of polyvinyl alcohol (Celanese Corporation, CELVOL 205), 0.025 g DUR-O-SET latex (0.014 g of actual latex polymer), and 1.0 mL of 1M pH 8.1 TRIS (tris (hydroxymethylaminomethane)) buffer. The poly(vinyl alcohol) was added to stabilize the latex against flocculation caused by dilution with buffer. Sample B was prepared in a similar manner by combining 0.050 g of catalyst polymer solution from Example 1 (0.030 g actual polymer) with 1.0 mL water, 1.0 mL of 1M pH 8.1 TRIS buffer, and 0.108 g DUR-O-SET latex. The catalyst polymer appears to stabilize the latex toward flocculation, without the need for additional poly(vinyl alcohol) stabilizer. Samples C, D, and E were prepared similarly to Sample B, using successively smaller amounts of latex (0.031, 0.020, and 0.013 g respectively.)

A stock solution was prepared comprising threat simulant (O,O'-diethyl chlorothiophosphate, 1.0 mL) and 5% of an internal standard for GC analysis (bis(2-ethoxy ethyl)ether, 0.050 mL), and 0.015 mL of this solution was added with stiffing at room temperature to each of Samples A through E, and the concentration of threat simulant remaining was monitored over time, as shown in the table below.

TABLE IV

Half-life of O,O'-Diethyl Chlorothiophosphate (minutes)

| Sample Name | Latex amount | Catalyst amount | Half-life of simulant |
| --- | --- | --- | --- |
| Sample A (control) | 25 mg | none | >100 min |
| Sample B | 108 mg | 30 mg | 2.6 min |
| Sample C | 31 mg | 30 mg | 1.9 min |
| Sample D | 20 mg | 30 mg | 2.0 min |
| Sample E | 13 mg | 30 mg | 2.0 min |

As can be seen, this example demonstrates the very rapid catalytic destruction of threat agent simulant in the absence of water-immiscible organic solvent. The destruction of threat agent simulant occurs much more quickly in buffer solutions containing both latex and catalyst than with latex alone. Over the range shown, the amount of latex polymer does not strongly affect the rate of reaction, with a slight trend toward decreasing rate with increasing latex amount.

Example 5

This example demonstrates the effectiveness of hypernucleophilic catalysts in detoxifying threat agents on a fabric surface. Ten identical 2 cm×2 cm swatches of undyed knit cotton/polyester blend fabric (0.095 g per swatch) were prepared. The description of four fabric-based experiments is given below.

Experiment A, catalyst with no buffer: In this experiment, plain fabric swatches were treated with 0.150 mL of a methanol solution containing 2.13 mg of catalyst polymer, as prepared in Example 1. The impregnated fabric was dried in an oven at 90 C. for 10 min.

Experiment B, catalyst with impregnated buffer. Fabric swatches were saturated with 0.200 mL of a 0.8 molar pH 9.8 carbonate buffer solution prepared in 20% ethanol in water. The swatches were dried in an oven at 90 C. for 30 min, and cooled to room temperature. The swatches were then treated with 0.150 mL of a methanol solution containing 2.13 mg of catalyst polymer, as prepared in Example 1. The impregnated fabric was dried in an oven at 90 C. for 10 min.

Experiment C, buffer with no catalyst. Fabric swatches were saturated with 0.200 mL of a 0.8 molar pH 9.8 carbonate buffer solution prepared in 20% ethanol in water. The swatches were dried in an oven at 90 C. for 30 min, and cooled to room temperature.

Experiment D, buffer with a 2× level of catalyst. Fabric swatches were saturated with 0.200 mL of a 0.8 molar pH 9.8 carbonate buffer solution prepared in 20% ethanol in water. The swatches were dried in an oven at 90 C. for 30 min, and cooled to room temperature. The swatches were then treated twice with 0.150 mL of a methanol solution containing 2.13 mg of catalyst polymer, as prepared in Example 1. The impregnated fabric was dried in an oven at 90 C. for 10 min after each catalyst application.

Impregnation of catalyst into the fabric caused little or no change in the feel or stiffness of the fabric swatches, and only a slight color change due to the yellow color of the catalyst polymer. Impregnation with carbonate buffer similarly caused little apparent change in the fabric feel or appearance.

Each fabric swatch from Experiments A, B, C, and D was treated with 0.150 mL of a hexane solution containing 5.0 microliters of threat simulant (O,O'-diethyl chlorothiophosphate, 1 mL) with 0.25 microliters (5%) of an internal standard for GC analysis (bis(2-ethoxy ethyl) ether. The hexane was evaporated in a fume hood for 5 minutes, and then each swatch was placed individually in a 20 mL glass vial with a screw cap. The concentration of threat simulant remaining for each experiment was monitored by at 20 minute intervals by extracting a fabric swatch from the experiment with 1 mL hexane, and measuring the concentration of remaining threat simulant by gas chromatography. Control experiments showed that no measurable reaction of threat simulant occurred in the hexane solution during initial deposition or final extraction. The results of the experiments are shown in the table below.

TABLE V

Detoxification on dry fabric: Percent threat simulant remaining.

| Experiment | Description | 20 minutes | 40 minutes | 60 minutes |
|---|---|---|---|---|
| A | 1x Catalyst, no buffer | >98% | >98% | >98% |
| B | 1x Catalyst w/buffer | 13.5% | <1% | <1% |
| C | no Catalyst w/buffer | >98% | >98% | >95% |
| D | 2x Catalyst w/buffer | <1% | <1% | <1% |

As can be seen, this example demonstrates remarkably rapid destruction of nerve agent simulant on nominally dry fabric treated with polymer catalysts of the invention, with a remarkably high loading of threat agent (>6 weight percent of the fabric) and a greater than 1:1 weight ratio of threat to catalyst. The hydrolysis of threat agent is also remarkably fast given the low concentration of water present on the nominally dry fabric swatches.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method of detoxifying a chemical threat agent, the method comprising applying a polymeric hypernucleophilic catalyst to a surface selected from the group consisting of paint, metal, fabric, wood, rubber, plastic, and skin, to establish contact between the polymeric hypernucleophilic catalyst and the chemical threat agent under conditions sufficient for hydrolytic destruction of the chemical threat agent, wherein the polymeric hypernucleophilic catalyst comprises a repeating aminopyridine moiety having an unsubstituted ring nitrogen.

2. The method of claim 1, wherein the chemical threat agent is selected from the group consisting of nerve agents, blister agents, mustard agents, and toxic industrial chemicals/materials.

3. The method of claim 2 wherein the chemical threat agent is selected from the group consisting of nerve agents, phosgene, ethylene oxide, methyl isocyanate, and mustard agents.

4. The method of claim 1, wherein the conditions sufficient for hydrolytic destruction of the chemical threat agent include a pH of about 6 to about 8.

5. The method of claim 4, wherein the pH ranges from about 7 to about 8.

6. The method of claim 1, wherein the conditions sufficient for hydrolytic destruction of the chemical threat agent include a pH of about 6 to about 9.

7. The method of claim 1, wherein the polymeric hypernucleophilic catalyst is based on the reaction of 4-chloropyridine with diallylamine to form a diallylamine pyridine monomer, followed by radical polymerization.

8. The method of claim 1, wherein the polymeric hypernucleophilic catalyst is based on the reaction of 4-chloropyridine with polyethylenimine.

9. A method of prophylacticly protecting a surface from a chemical threat agent, the method comprising applying a polymeric hypernucleophilic catalyst to a surface selected from the group consisting of paint, metal, fabric, wood, rubber, plastic, and skin, to permit contact between the polymeric hypernucleophilic catalyst and the chemical threat agent wherein the polymeric hypernucleophilic catalyst comprises a repeating aminopyridine moiety having an unsubstituted ring nitrogen.

10. A composition for detoxifying or prophylacticly protecting a surface against a chemical threat agent, the composition comprising an effective amount of a polymeric hypernucleophilic catalyst and one or more excipients, wherein the polymeric hypernucleophilic catalyst comprises a repeating aminopyridine moiety having an unsubstituted ring nitrogen, and wherein the composition is formulated as a spray, lotion, cream, gel, foam, concentrate, or solution.

11. The composition of claim 10, wherein the one or more excipients comprises a polymer latex.

12. The composition of claim 11 which is an aqueous solution containing latex polymer particles.

13. The composition of claim 10, wherein the polymeric hypernucleophilic catalyst is based on the reaction of 4-chloropyridine with diallylamine to form a diallylamine pyridine monomer, followed by radical polymerization.

14. The composition of claim 10, wherein the polymeric hypernucleophilic catalyst is based on the reaction of 4-chloropyridine with polyethylenimine.

15. An article for detoxifying or prophylacticly protecting a surface against a chemical threat agent, the article comprising an effective amount of a polymeric hypernucleophilic catalyst attached to a fabric or membrane through reactive alcohol or amine functionality so as to permit contact between the polymeric hypernucleophilic catalyst and the chemical threat agent, wherein the polymeric hypernucleophilic catalyst comprises a repeating aminopyridine moiety having an unsubstituted ring nitrogen, and wherein the article is a filter, wipe, membrane, yarn, fabric, latex paint film or article of clothing.

16. The article of claim 15 which is a cotton/polyester blend fabric.

17. The article of claim 15 which is a cotton/nylon blend fabric.

18. The article of claim 15 which is a nominally dry fabric treated with the polymeric hypernucleophilic catalyst.

19. The article of claim 15 which is a latex paint film.

20. The article of claim 15, wherein the polymeric hypernucleophilic catalyst is based on the reaction of 4-chloropyridine with diallylamine to form a diallylamine pyridine monomer, followed by radical polymerization.

21. The article of claim 15, wherein the polymeric hypernucleophilic catalyst is based on the reaction of 4-chloropyridine with polyethylenimine.

* * * * *